US010147356B2

(12) United States Patent
Kuang

(10) Patent No.: US 10,147,356 B2
(45) Date of Patent: Dec. 4, 2018

(54) OLED PIXEL DRIVING CIRCUIT AND OLED DISPLAY DEVICE

(71) Applicant: Shenzhen China Star Optoelectronics Technology Co., Ltd., Shenzhen (CN)

(72) Inventor: Jimu Kuang, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 52 days.

(21) Appl. No.: 15/519,837

(22) PCT Filed: Mar. 15, 2017

(86) PCT No.: PCT/CN2017/076778

§ 371 (c)(1),
(2) Date: Apr. 18, 2017

(87) PCT Pub. No.: WO2018/152893

PCT Pub. Date: Aug. 30, 2018

(65) Prior Publication Data

US 2018/0301090 A1 Oct. 18, 2018

(30) Foreign Application Priority Data

Feb. 24, 2017 (CN) .......................... 2017 1 0104522

(51) Int. Cl.
*G06F 3/045* (2006.01)
*G09G 3/3258* (2016.01)

(52) U.S. Cl.
CPC ... *G09G 3/3258* (2013.01); *G09G 2300/0465* (2013.01); *G09G 2300/0819* (2013.01); *G09G 2320/0233* (2013.01); *G09G 2320/045* (2013.01)

(58) Field of Classification Search
CPC ......... G06F 3/412; G06F 3/0414; G06F 3/044
USPC .................................................. 345/173, 174
See application file for complete search history.

(56) References Cited

FOREIGN PATENT DOCUMENTS

| | | |
|---|---|---|
| CN | 103165079 A | 6/2013 |
| CN | 104637440 A | 5/2015 |
| CN | 104658474 A | 5/2015 |
| CN | 104751793 A | 7/2015 |
| CN | 105489159 A | 4/2016 |
| KR | 20100069427 A | 6/2010 |

*Primary Examiner* — Calvin C Ma
(74) *Attorney, Agent, or Firm* — Leong C. Lei

(57) ABSTRACT

The OLED pixel driving circuit adds the third thin film transistor (T3) and arranges the switch (K) on the basis of the 2T1C structure. The first pin (K1) of the switch (K) is electrically coupled to the drain of the third thin film transistor (T3), and the second pin (K2) is electrically coupled to the digital to analog converter (DAC), and the third pin is electrically coupled to the analog to digital converter (ADC). The switch signal (Switch) is used to control the switch (K) to connect the first pin (K1) and the second pin (K2) for entering the display mode, and the switch signal (Switch) is used to control the switch (K) to connect the first pin (K1) and the third pin (K3) for entering the sensing mode so that the analog to digital converter (ADC) can sense the threshold voltage (Vth) of the second thin film transistor (T2).

12 Claims, 5 Drawing Sheets

OLED PIXEL DRIVING CIRCUIT AND OLED DISPLAY DEVICE

FIELD OF THE INVENTION

The present invention relates to a display technology field, and more particularly to an OLED pixel driving circuit and an OLED display device.

BACKGROUND OF THE INVENTION

The Organic Light Emitting Display (OLED) possesses many outstanding properties of self-illumination, low driving voltage, high luminescence efficiency, short response time, high clarity and contrast, near 180° view angle, wide range of working temperature, applicability of flexible display and large scale full color display. The OLED is considered as the most potential display device.

The OLED is a current driving element. When the electrical current flows through the organic light emitting diode, the organic light emitting diode emits light, and the brightness is determined according to the current flowing through the organic light emitting diode itself. Most of the present Integrated Circuits (IC) only transmit voltage signals. Therefore, the OLED pixel driving circuit needs to accomplish the task of converting the voltage signals into the current signals. The traditional OLED pixel driving circuit generally is 2T1C, which is a structure comprising two thin film transistors and one capacitor to convert the voltage into the current.

As shown in FIG. 1, which is a 2T1C pixel driving circuit employed for OLED, comprising a first thin film transistor T10, a second thin film transistor T20 and a capacitor C10. The first thin film transistor T10 is a switch thin film transistor, and the second thin film transistor T20 is a drive thin film transistor, and the capacitor C10 is a storage capacitor. Specifically, a gate of the first thin film transistor T10 receiving a scan signal Scan, and a drain receiving a data signal Data, and a source being electrically coupled to a gate of the second thin film transistor T20 and one end of the capacitor C10; a drain of the second thin film transistor T20 receiving the power source voltage OVDD, and a source being electrically coupled to an anode of the organic light emitting diode D10; a cathode of the organic light emitting diode D10 receiving a common ground voltage OVSS; one end of the capacitor C10 being electrically coupled to the gate of the second thin film transistor T20, and the other end being electrically coupled to a source of the second thin film transistor T20. As the OLED displays, the scan signal Scan controls the first thin film transistor T10 to be activated, and the data signal Data enters the gate of the second thin film transistor T20 and the capacitor C10 via the first thin film transistor T10. Then, the first thin film transistor T10 is deactivated. With the storage function of the capacitor C10, the gate voltage of the second thin film transistor T20 can remain to hold the data signal voltage to make the second thin film transistor T20 to be in the conducted state to drive the current to enter the organic light emitting diode D10 via the second thin film transistor T20 and to drive the organic light emitting diode D10 to emit light.

The formula of the current flowing through the thin film transistor and the organic light emitting diode according to calculation is:

$$I_{OLED}=K\times(Vgs-Vth)^2$$

wherein $I_{OLED}$ represents a current flowing through the driving thin film transistor and the organic light emitting diode, and K is an intrinsic conductive factor of the driving thin film transistor, and Vgs represents a voltage difference between the gate and the source of the driving thin film transistor, and Vth represents a threshold voltage of the driving thin film transistor. Accordingly, the value of the $I_{OLED}$ is relevant with the threshold voltage Vth of the driving thin film transistor.

The structure of the foregoing traditional OLED pixel driving circuit is simpler and does not possess compensation function, and thus lots of defects exist, wherein the more obvious one is: due to the nonconsistency in the manufacture process of the thin film transistor, the threshold voltages of the driving thin film transistors of all pixels in the OLED display device are not consistent; and the long period of working time will age the material of the driving thin film transistors to lead to the drifts of the threshold voltages of the driving thin film transistors and the to cause the phenomenon of the nonuniform display.

FIG. 2 shows a 3T1C structure OLED pixel driving circuit with compensation function according to prior art. On the basis of the traditional OLED pixel driving circuit shown in FIG. 1, a third thin film transistor T30 is added, and a gate of the third thin film transistor T30 receives a sensing control signal Sense, and a source is electrically coupled to a source of the second thin film transistor T20, and a drain is electrically coupled to a analog to digital converter and receives a reference voltage signal Vref, and a data signal Data is provided by a digital to analog converter. The OLED pixel driving circuit of 3T1C structure can sense the threshold voltage Vth of the driving thin film transistor, and compensate the Vth value to the data signal Data, which can eliminate the influence of the threshold voltage Vth of the driving thin film transistor to the current $I_{OLED}$ flowing through the organic light emitting diode, and thus to make the display uniform to improve the image quality. However, the OLED pixel driving circuit of 3T1C structure has drawbacks:

1. the reference voltage signal Vref provides the reference voltages to the respective pixels, and the wiring causes the aperture of the pixel decrease.

2. The generation of the reference voltage signal Vref increases the channel amount of the driving IC to increase the manufacture cost.

SUMMARY OF THE INVENTION

An objective of the present invention is to provide an OLED pixel driving circuit, which does not only have compensation function but also can eliminate the influence of the threshold voltage of the driving thin film transistor to the current flowing through the organic light emitting diode to promote the display uniformity and to raise the aperture ratio of the pixel for reducing the manufacture cost.

Another objective of the present invention is to provide an OLED display device, of which the pixel driving circuit possesses compensation function, and the display uniformity is better, and the aperture ratio of the pixel is higher, and the manufacture cost is lower.

For realizing the aforesaid objectives, the present invention first provides an OLED pixel driving circuit, comprising a first thin film transistor, a second thin film transistor, a third thin film transistor, a capacitor, an organic light emitting diode, and a switch, a digital to analog converter and an analog to digital converter located inside a driving IC;

operating states of the OLED pixel driving circuit including a display mode and a sensing mode;

the switch being controlled by a switch signal and comprising a first pin, a second pin and a third pin;

a gate of the first thin film transistor receiving a scan signal, and a drain receiving a power source voltage, and a source being electrically coupled to a gate of the second thin film transistor and one end of the capacitor; a drain of the second thin film transistor receiving the power source voltage, and a source being electrically coupled to an anode of the organic light emitting diode; a cathode of the organic light emitting diode receiving a common ground voltage; the other end of the capacitor being electrically coupled to a source of the second thin film transistor; a gate of the third thin film transistor receiving the scan signal in the display mode and receiving a sensing control signal in the sensing mode, and a source being electrically coupled to the source of the second thin film transistor, and a drain being electrically coupled to the first pin of the switch;

the second pin of the switch being electrically coupled to the digital to analog converter, and the third pin being electrically coupled to the analog to digital converter;

in the display mode, the switch signal controlling the switch to connect the first pin and the second pin, and the digital to analog converter providing a data signal; in the sensing mode, the digital to analog converter first providing a low voltage level signal, and then the switch signal controlling the switch to connect the first pin and the third pin to make the analog to digital converter sense a threshold voltage of the second thin film transistor.

A voltage level of the data signal is not higher than a threshold voltage of the organic light emitting diode, and the power source voltage is higher than a sum of the threshold voltage of the organic light emitting diode and the threshold voltage of the second thin film transistor.

The threshold voltage of the organic light emitting diode is 10V.

In the display mode: the scan signal first provides a high voltage level pulse, and maintains a low voltage level; the common ground voltage constantly is the low voltage level; the data signal begins to be a high voltage level, constantly from a rising edge of the high voltage level pulse of the scan signal;

in the sensing mode, the scan signal first provides the high voltage level pulse, and maintains the low voltage level; the sensing control signal first provides a high voltage level pulse synchronized with the high voltage level pulse of the scan signal, and maintains the low voltage level.

In the sensing mode: the common ground voltage first provides a high voltage level pulse synchronized with the high voltage level pulse of the sensing control signal and maintains the low voltage level.

The present invention further provides an OLED display device, comprising an OLED pixel driving circuit, and the OLED pixel driving circuit comprising a first thin film transistor, a second thin film transistor, a third thin film transistor, a capacitor, an organic light emitting diode, and a switch, a digital to analog converter and an analog to digital converter located inside a driving IC; operating states of the OLED pixel driving circuit including a display mode and a sensing mode;

the switch being controlled by a switch signal and comprising a first pin, a second pin and a third pin;

a gate of the first thin film transistor receiving a scan signal, and a drain receiving a power source voltage, and a source being electrically coupled to a gate of the second thin film transistor and one end of the capacitor; a drain of the second thin film transistor receiving the power source voltage, and a source being electrically coupled to an anode of the organic light emitting diode; a cathode of the organic light emitting diode receiving a common ground voltage; the other end of the capacitor being electrically coupled to a source of the second thin film transistor; a gate of the third thin film transistor receiving the scan signal in the display mode and receiving a sensing control signal in the sensing mode, and a source being electrically coupled to the source of the second thin film transistor, and a drain being electrically coupled to the first pin of the switch;

the second pin of the switch being electrically coupled to the digital to analog converter, and the third pin being electrically coupled to the analog to digital converter;

in the display mode, the switch signal controlling the switch to connect the first pin and the second pin, and the digital to analog converter providing a data signal; in the sensing mode, the digital to analog converter first providing a low voltage level signal, and then the switch signal controlling the switch to connect the first pin and the third pin to make the analog to digital converter sense a threshold voltage of the second thin film transistor.

A voltage level of the data signal is not higher than a threshold voltage of the organic light emitting diode, and the power source voltage is higher than a sum of the threshold voltage of the organic light emitting diode and the threshold voltage of the second thin film transistor.

The threshold voltage of the organic light emitting diode is 10V.

In the display mode: the scan signal first provides a high voltage level pulse, and maintains a low voltage level; the common ground voltage constantly is the low voltage level; the data signal begins to be a high voltage level, constantly from a rising edge of the high voltage level pulse of the scan signal;

in the sensing mode, the scan signal first provides the high voltage level pulse, and maintains the low voltage level; the sensing control signal first provides a high voltage level pulse synchronized with the high voltage level pulse of the scan signal, and maintains the low voltage level.

In the sensing mode: the common ground voltage first provides a high voltage level pulse synchronized with the high voltage level pulse of the sensing control signal and maintains the low voltage level.

The present invention further provides an OLED pixel driving circuit, comprising a first thin film transistor, a second thin film transistor, a third thin film transistor, a capacitor, an organic light emitting diode, and a switch, a digital to analog converter and an analog to digital converter located inside a driving IC; operating states of the OLED pixel driving circuit including a display mode and a sensing mode;

the switch being controlled by a switch signal and comprising a first pin, a second pin and a third pin;

a gate of the first thin film transistor receiving a scan signal, and a drain receiving a power source voltage, and a source being electrically coupled to a gate of the second thin film transistor and one end of the capacitor; a drain of the second thin film transistor receiving the power source voltage, and a source being electrically coupled to an anode of the organic light emitting diode; a cathode of the organic light emitting diode receiving a common ground voltage; the other end of the capacitor being electrically coupled to a source of the second thin film transistor; a gate of the third thin film transistor receiving the scan signal in the display mode and receiving a sensing control signal in the sensing mode, and a source being electrically coupled to the source of the second thin film transistor, and a drain being electrically coupled to the first pin of the switch;

the second pin of the switch being electrically coupled to the digital to analog converter, and the third pin being electrically coupled to the analog to digital converter;

in the display mode, the switch signal controlling the switch to connect the first pin and the second pin, and the digital to analog converter providing a data signal; in the sensing mode, the digital to analog converter first providing a low voltage level signal, and then the switch signal controlling the switch to connect the first pin and the third pin to make the analog to digital converter sense a threshold voltage of the second thin film transistor;

wherein a voltage level of the data signal is not higher than a threshold voltage of the organic light emitting diode, and the power source voltage is higher than a sum of the threshold voltage of the organic light emitting diode and the threshold voltage of the second thin film transistor;

wherein the threshold voltage of the organic light emitting diode is 10V;

wherein in the display mode: the scan signal first provides a high voltage level pulse, and maintains a low voltage level; the common ground voltage constantly is the low voltage level; the data signal begins to be a high voltage level, constantly from a rising edge of the high voltage level pulse of the scan signal;

in the sensing mode, the scan signal first provides the high voltage level pulse, and maintains the low voltage level; the sensing control signal first provides a high voltage level pulse synchronized with the high voltage level pulse of the scan signal, and maintains the low voltage level.

The benefits of the present invention are: the present invention provides the OLED pixel driving circuit and the OLED display device, which adds the third thin film transistor and arranges the switch on the basis of the 2T1C structure. The first pin of the switch is electrically coupled to the drain of the third thin film transistor, and the second pin is electrically coupled to the digital to analog converter, and the third pin is electrically coupled to the analog to digital converter. The switch signal is used to control the switch to connect the first pin and the second pin for entering the display mode, and the switch signal is used to control the switch to connect the first pin and the third pin for entering the sensing mode so that the analog to digital converter can sense the threshold voltage of the second thin film transistor to be employed for the data compensation in the display mode after the analog to digital conversion for possessing the compensation function to eliminate the influence of the threshold voltage of the driving thin film transistor to the current flowing through the organic light emitting diode and to promote the uniformity of the display, and the additional arrangement of the reference voltage signal like prior art is not required to raise the aperture ratio of the pixel and to reduce the manufacture cost.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
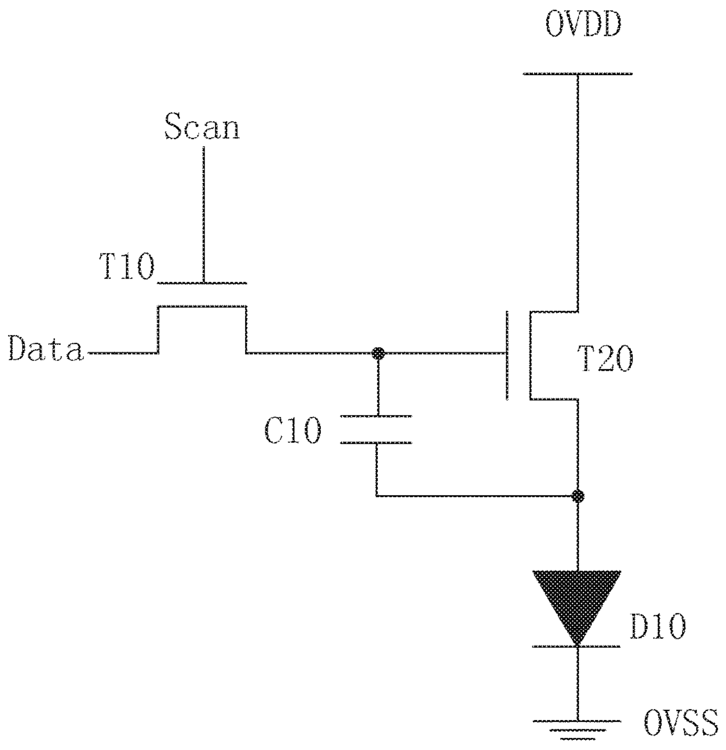
FIG. 1 is a circuit diagram of a 2T1C pixel driving circuit used for an OLED according to prior art.
Figure 2:
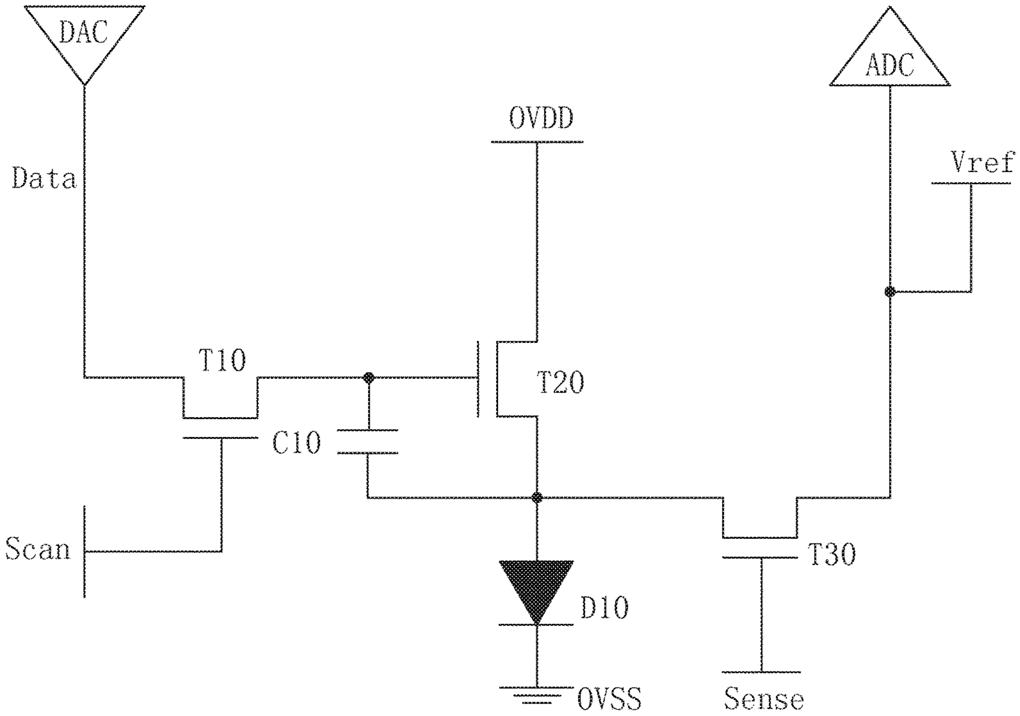
FIG. 2 is a circuit diagram of a 3T1C structure OLED pixel driving circuit with compensation function according to prior art.
Figure 3:
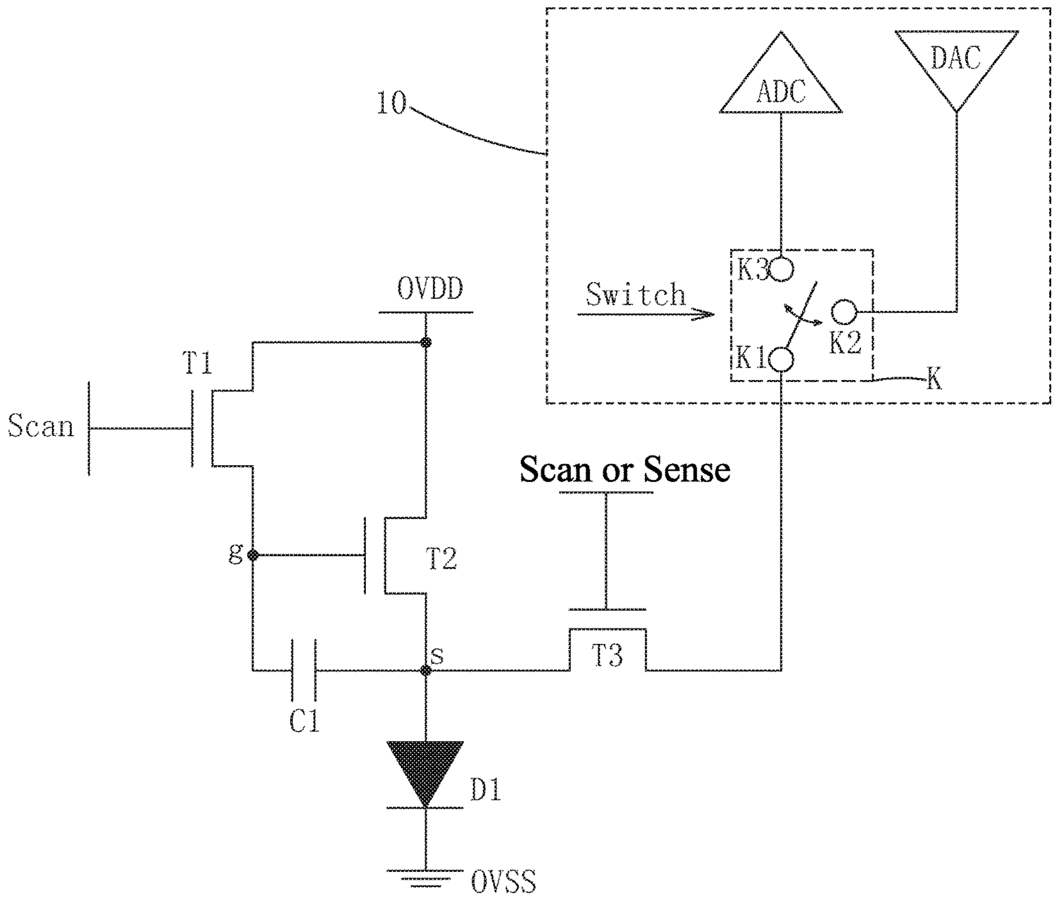
FIG. 3 is a circuit diagram of an OLED pixel driving circuit according to the present invention.
Figure 4:
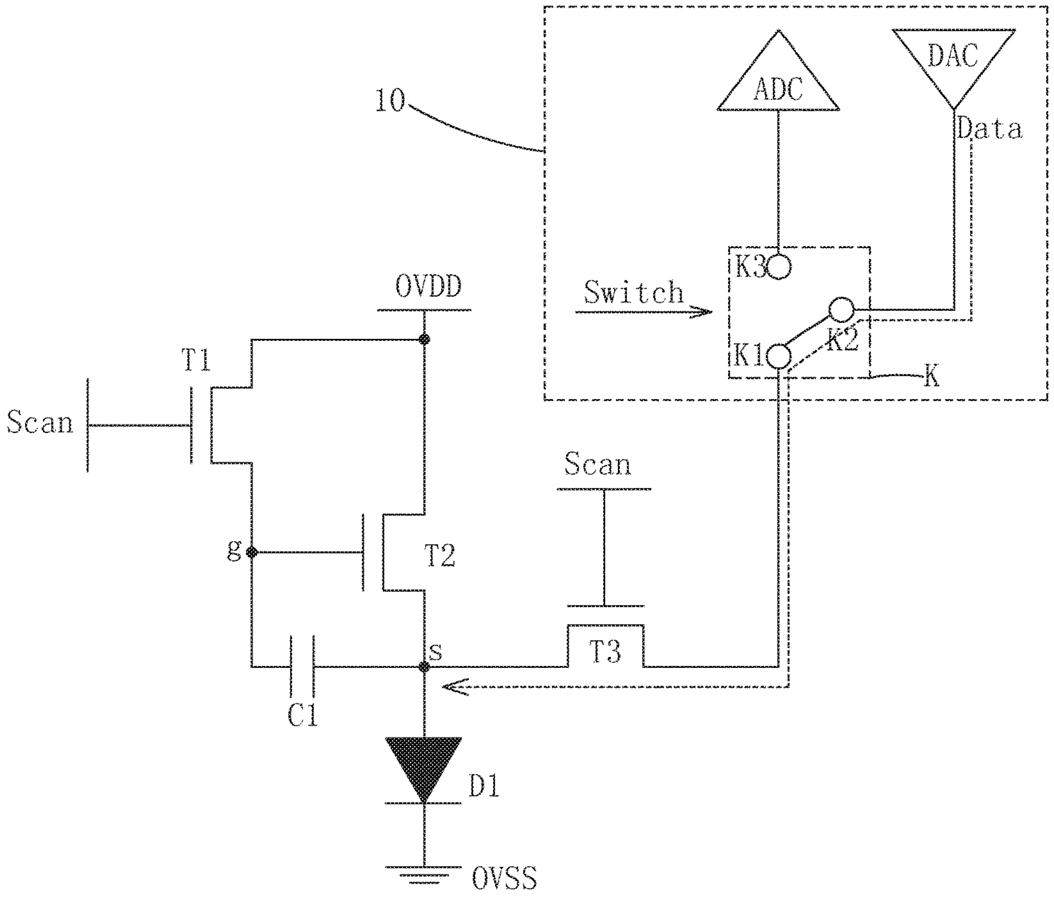
FIG. 4 is a circuit connection diagram of an OLED pixel driving circuit according to the present invention in a display mode.
Figure 5:
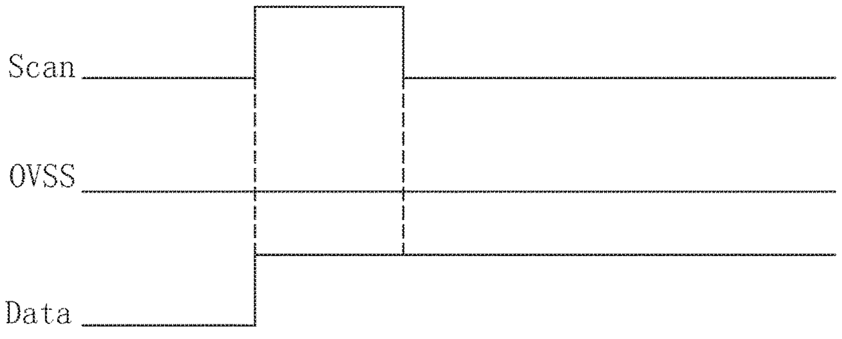
FIG. 5 is a sequence diagram of an OLED pixel driving circuit according to the present invention in a display mode.
Figure 6:
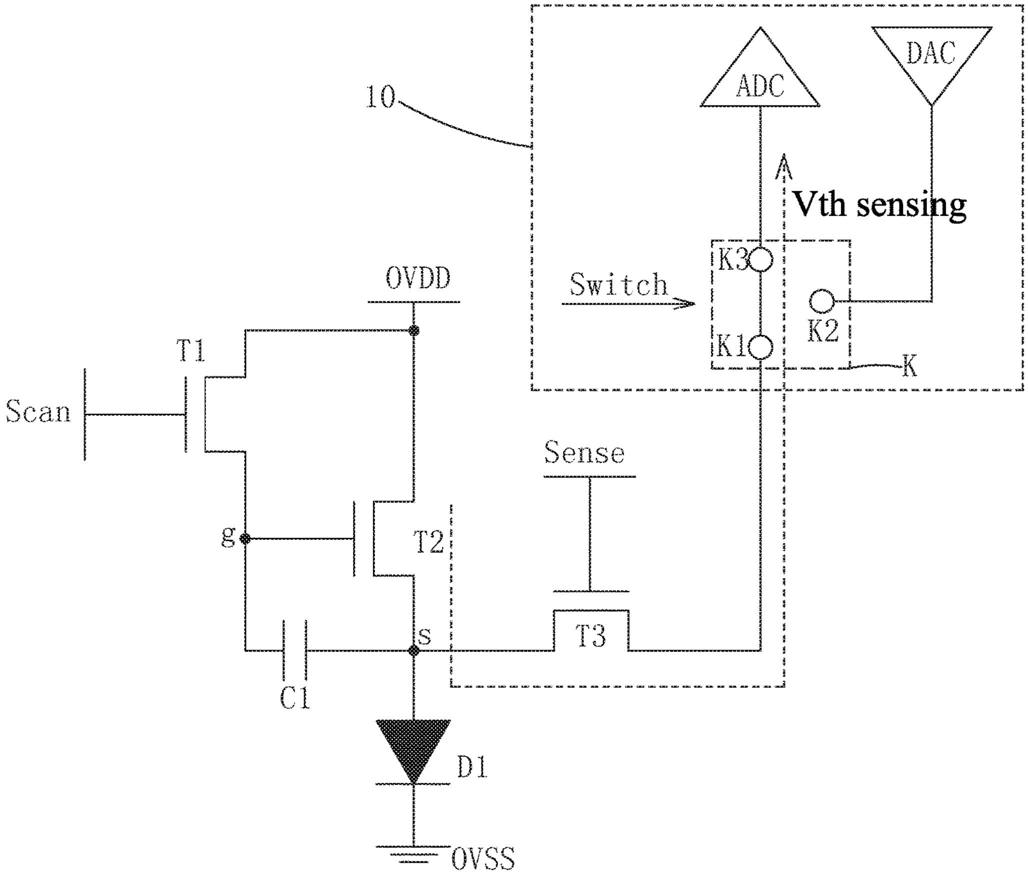
FIG. 6 is a circuit connection diagram of an OLED pixel driving circuit according to the present invention in a sensing mode.

Please refer from FIG. 3 to FIG. 7. The present invention provides an OLED pixel driving circuit. As shown in FIG. 3, FIG. 4 and FIG. 6, the OLED pixel driving circuit of the present invention comprises a first thin film transistor T1, a second thin film transistor T2, a third thin film transistor T3, a capacitor C1, an organic light emitting diode D1, and a switch K, a digital to analog converter DAC and an analog to digital converter ADC located inside a driving IC 10. The second thin film transistor T2 is the driving thin film transistor which directly drives the organic light emitting diode D1.

On the basis of the 2T1C structure, the OLED pixel driving circuit is added with the third thin film transistor T3 and configured with the switch K, and the operating states includes a display mode and a sensing mode.

Specifically, the switch K is controlled by a switch signal Switch, and comprises a first pin K1, a second pin K2 and a third pin K3;

a gate of the first thin film transistor T1 receiving a scan signal Scan, and a drain receiving a power source voltage OVDD, and a source being electrically coupled to a gate of the second thin film transistor T2 and one end of the capacitor C1; a drain of the second thin film transistor T2 receiving the power source voltage OVDD, and a source being electrically coupled to an anode of the organic light emitting diode D1; a cathode of the organic light emitting diode D1 receiving a common ground voltage OVSS; the other end of the capacitor C1 being electrically coupled to a source of the second thin film transistor T2; a gate of the third thin film transistor T3 receiving the scan signal Scan in the display mode and receiving a sensing control signal Sense in the sensing mode, and a source being electrically coupled to the source of the second thin film transistor T2, and a drain being electrically coupled to the first pin K1 of the switch K;

the second pin K2 of the switch K being electrically coupled to the digital to analog converter DAC, and the third pin K3 being electrically coupled to the analog to digital converter ADC.

All of the first thin film transistor T1, the second thin film transistor T2 and the third thin film transistor T3 are low temperature poly-silicon thin film transistors, oxide semiconductor thin film transistors or amorphous silicon thin film transistors.

With combination of FIG. 4 and FIG. 5, in the display mode: the switch signal Switch controls the switch K to connect the first pin K1 and the second pin K2, and the digital to analog converter DAC provides the data signal Data. The scan signal Scan first provides a high voltage level pulse so that both the first thin film transistor T1 and the third thin film transistor T3 are on. In this stage, the power source voltage OVDD enters the gate g of the second thin film transistor T2 via the first thin film transistor T1 which is on, i.e. Vg=OVDD (Vg represents the voltage level of the gate g of the second thin film transistor T2); the data signal Data begins to be a high voltage level, constantly from a rising edge of the high voltage level pulse of the scan signal Scan, and the data signal Data is written into the source s of the second thin film transistor T2 via the first pin K1 and the second pin K2 of the switch K, and the third thin film transistor T3 which is on, i.e. Vs=$V_{Data}$ (Vs represents the voltage level of the source s of the second thin film transistor T2, and $V_{Data}$ represents the voltage level of the data signal Data). Then, the scan signal Scan maintains a low voltage level to make the first thin film transistor T1 and the third thin film transistor T3 be off, and relying on the storage function of the capacitor C1, the organic light emitting diode D1 emits light and performs display.

Significantly, in the display mode, the common ground voltage OVSS constantly is the low voltage level; a voltage level $V_{Data}$ of the data signal Data is not higher than a threshold voltage Vth-$_{OLED}$ of the organic light emitting diode D1, i.e. $V_{Data}$≤Vth-$_{OLED}$, and furthermore, the threshold voltage Vth-$_{OLED}$ of the organic light emitting diode D1 is about 10V (for an organic light emitting diode having three or four light emitting layers), thus, it can ensures that the voltage level Vs of the source s of the second thin film transistor T2 cannot light up the organic light emitting diode D1 in the process of writing the Data signal Data; the power source voltage OVDD is higher than a sum of the threshold voltage Vth-$_{OLED}$ of the organic light emitting diode D1 and the threshold voltage Vth of the second thin film transistor T2, i.e. OVDD>Vth-$_{OLED}$+Vth. Accordingly, after writing the Data signal Data is accomplished, the voltage Vgs between the gate g and the source s of the second thin film transistor T2 is:

$$Vgs=Vg-Vs=\mathrm{OVDD}-V_{Data}>Vth$$

to ensure that the organic light emitting diode D1 can normally light and display.

Figure 7:
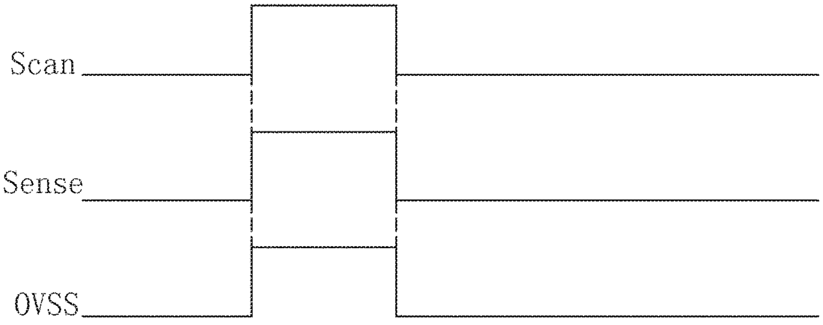
FIG. 7 is a sequence diagram of an OLED pixel driving circuit according to the present invention in a sensing mode.

With combination of FIG. 6 and FIG. 7, in the sensing mode: the scan signal Scan first provides a high voltage level to make the first thin film transistor T1 on, and the power source voltage OVDD enters the gate g of the second thin film transistor T2 via the first thin film transistor T1 which is on, i.e. Vg=OVDD; the sensing control signal Sense first provides a high voltage level pulse synchronized with the high voltage level pulse of the scan signal Scan to make the third thin film transistor T3 on, and the switch signal Switch first maintains the switch K to connect the first pin K1 and the second pin K2, and the digital to analog converter DAC first provides a low voltage level signal to be written into the source s of the second thin film transistor T2 via the first pin K1 and the second pin K2 of the switch K, and the third thin film transistor T3 which is on, and meanwhile, the common ground voltage OVSS first provides a high voltage level pulse synchronized with the high voltage level pulse of the sensing control signal Sense to ensure that the organic light emitting diode D1 cannot be lighted up. Next, the switch signal Switch controls the switch K to connect the first pin K1 and the third pin K3. Then, because the voltage level of the gate g of the second thin film transistor T2 is OVDD, and the source s is at a lower voltage level, and the analog to digital converter ADC can sense the threshold voltage Vth of the second thin film transistor T2, i.e. the driving thin film transistor via the third thin film transistor T3 which is on, and the first pin K1 and the third pin K3 of the switch K. Thereafter, all the scan signal Scan, the sensing control signal Sense and the common ground voltage OVSS are transferred to be low voltage levels and maintain the same.

The analog to digital converter ADC senses the threshold voltage Vth of the second thin film transistor T2, i.e. the driving thin film transistor, and then converts the same into the digital sensing data, and saves the digital sensing data for the data compensation in the display mode. In the display mode, the threshold voltage Vth of the second thin film transistor T2, i.e. the driving thin film transistor is compensated, and the current flowing through the organic light emitting diode D1 is irrelevant with the threshold voltage Vth of the driving thin film transistor to eliminate the influence of the threshold voltage of the driving thin film transistor to the current flowing through the organic light emitting diode D1 to promote the uniformity of the display and raise the luminescence efficiency. The OLED pixel driving circuit of the present invention does not need the additional arrangement of the reference voltage signal as prior arts do, and then omits the wiring of the reference voltage signal to decrease the channel amount of the driving IC and to raise the aperture ratio of the pixel to reduce the manufacture cost.

On the basis of the same inventive idea, the present invention further provides an OLED display device, comprising the aforesaid OLED pixel driving circuit. The descriptions of the structure and the function of the OLED pixel driving circuit are not repeated here.

In conclusion, the OLED pixel driving circuit and the OLED display device of the present invention adds the third thin film transistor and arranges the switch on the basis of the 2T1C structure. The first pin of the switch is electrically coupled to the drain of the third thin film transistor, and the second pin is electrically coupled to the digital to analog converter, and the third pin is electrically coupled to the analog to digital converter. The switch signal is used to control the switch to connect the first pin and the second pin for entering the display mode, and the switch signal is used to control the switch to connect the first pin and the third pin for entering the sensing mode so that the analog to digital converter can sense the threshold voltage of the second thin film transistor to be employed for the data compensation in the display mode after the analog to digital conversion for possessing the compensation function to eliminate the influence of the threshold voltage of the driving thin film transistor to the current flowing through the organic light emitting diode and to promote the uniformity of the display, and the additional arrangement of the reference voltage signal like prior art is not required to raise the aperture ratio of the pixel and to reduce the manufacture cost.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An OLED pixel driving circuit, comprising a first thin film transistor, a second thin film transistor, a third thin film transistor, a capacitor, an organic light emitting diode, and a switch, a digital to analog converter and an analog to digital converter located inside a driving IC; operating states of the OLED pixel driving circuit including a display mode and a sensing mode;

the switch being controlled by a switch signal and comprising a first pin, a second pin and a third pin;

a gate of the first thin film transistor receiving a scan signal, and a drain receiving a power source voltage, and a source being electrically coupled to a gate of the second thin film transistor and one end of the capacitor; a drain of the second thin film transistor receiving the power source voltage, and a source being electrically coupled to an anode of the organic light emitting diode; a cathode of the organic light emitting diode receiving a common ground voltage; the other end of the capacitor being electrically coupled to a source of the second thin film transistor; a gate of the third thin film transistor receiving the scan signal in the display mode and receiving a sensing control signal in the sensing mode, and a source being electrically coupled to the source of the second thin film transistor, and a drain being electrically coupled to the first pin of the switch;

the second pin of the switch being electrically coupled to the digital to analog converter, and the third pin being electrically coupled to the analog to digital converter;

in the display mode, the switch signal controlling the switch to connect the first pin and the second pin, and the digital to analog converter providing a data signal; in the sensing mode, the digital to analog converter first providing a low voltage level signal, and then the switch signal controlling the switch to connect the first pin and the third pin to make the analog to digital converter sense a threshold voltage of the second thin film transistor.

2. The OLED pixel driving circuit according to claim 1, wherein a voltage level of the data signal is not higher than a threshold voltage of the organic light emitting diode, and the power source voltage is higher than a sum of the threshold voltage of the organic light emitting diode and the threshold voltage of the second thin film transistor.

3. The OLED pixel driving circuit according to claim 2, wherein the threshold voltage of the organic light emitting diode is 10V.

4. The OLED pixel driving circuit according to claim 2, wherein in the display mode: the scan signal first provides a high voltage level pulse, and maintains a low voltage level; the common ground voltage constantly is the low voltage level; the data signal begins to be a high voltage level, constantly from a rising edge of the high voltage level pulse of the scan signal;

in the sensing mode, the scan signal first provides the high voltage level pulse, and maintains the low voltage level; the sensing control signal first provides a high voltage level pulse synchronized with the high voltage level pulse of the scan signal, and maintains the low voltage level.

5. The OLED pixel driving circuit according to claim 4, wherein in the sensing mode: the common ground voltage first provides a high voltage level pulse synchronized with the high voltage level pulse of the sensing control signal and maintains the low voltage level.

6. An OLED display device, comprising an OLED pixel driving circuit, and the OLED pixel driving circuit comprising a first thin film transistor, a second thin film transistor, a third thin film transistor, a capacitor, an organic light emitting diode, and a switch, a digital to analog converter and an analog to digital converter located inside a driving IC; operating states of the OLED pixel driving circuit including a display mode and a sensing mode;

the switch being controlled by a switch signal and comprising a first pin, a second pin and a third pin;

a gate of the first thin film transistor receiving a scan signal, and a drain receiving a power source voltage, and a source being electrically coupled to a gate of the second thin film transistor and one end of the capacitor; a drain of the second thin film transistor receiving the power source voltage, and a source being electrically coupled to an anode of the organic light emitting diode; a cathode of the organic light emitting diode receiving a common ground voltage; the other end of the capacitor being electrically coupled to a source of the second thin film transistor; a gate of the third thin film transistor receiving the scan signal in the display mode and receiving a sensing control signal in the sensing mode, and a source being electrically coupled to the source of the second thin film transistor, and a drain being electrically coupled to the first pin of the switch;

the second pin of the switch being electrically coupled to the digital to analog converter, and the third pin being electrically coupled to the analog to digital converter;

in the display mode, the switch signal controlling the switch to connect the first pin and the second pin, and the digital to analog converter providing a data signal; in the sensing mode, the digital to analog converter first providing a low voltage level signal, and then the switch signal controlling the switch to connect the first pin and the third pin to make the analog to digital converter sense a threshold voltage of the second thin film transistor.

7. The OLED display device according to claim 6, wherein a voltage level of the data signal is not higher than a threshold voltage of the organic light emitting diode, and the power source voltage is higher than a sum of the threshold voltage of the organic light emitting diode and the threshold voltage of the second thin film transistor.

8. The OLED display device according to claim 7, wherein the threshold voltage of the organic light emitting diode is 10V.

9. The OLED display device according to claim 7, wherein in the display mode: the scan signal first provides a high voltage level pulse, and maintains a low voltage level; the common ground voltage constantly is the low voltage level; the data signal begins to be a high voltage level, constantly from a rising edge of the high voltage level pulse of the scan signal;

in the sensing mode, the scan signal first provides the high voltage level pulse, and maintains the low voltage level; the sensing control signal first provides a high voltage level pulse synchronized with the high voltage level pulse of the scan signal, and maintains the low voltage level.

10. The OLED display device according to claim 9, wherein in the sensing mode: the common ground voltage first provides a high voltage level pulse synchronized with the high voltage level pulse of the sensing control signal and maintains the low voltage level.

11. An OLED pixel driving circuit, comprising a first thin film transistor, a second thin film transistor, a third thin film transistor, a capacitor, an organic light emitting diode, and a switch, a digital to analog converter and an analog to digital converter located inside a driving IC; operating states of the OLED pixel driving circuit including a display mode and a sensing mode;

the switch being controlled by a switch signal and comprising a first pin, a second pin and a third pin;

a gate of the first thin film transistor receiving a scan signal, and a drain receiving a power source voltage, and a source being electrically coupled to a gate of the second thin film transistor and one end of the capacitor; a drain of the second thin film transistor receiving the power source voltage, and a source being electrically coupled to an anode of the organic light emitting diode; a cathode of the organic light emitting diode receiving a common ground voltage; the other end of the capacitor being electrically coupled to a source of the second thin film transistor; a gate of the third thin film transistor receiving the scan signal in the display mode and receiving a sensing control signal in the sensing mode, and a source being electrically coupled to the source of the second thin film transistor, and a drain being electrically coupled to the first pin of the switch;

the second pin of the switch being electrically coupled to the digital to analog converter, and the third pin being electrically coupled to the analog to digital converter;

in the display mode, the switch signal controlling the switch to connect the first pin and the second pin, and the digital to analog converter providing a data signal; in the sensing mode, the digital to analog converter first providing a low voltage level signal, and then the switch signal controlling the switch to connect the first pin and the third pin to make the analog to digital converter sense a threshold voltage of the second thin film transistor;

wherein a voltage level of the data signal is not higher than a threshold voltage of the organic light emitting diode, and the power source voltage is higher than a sum of the threshold voltage of the organic light emitting diode and the threshold voltage of the second thin film transistor;

wherein the threshold voltage of the organic light emitting diode is 10V;

wherein in the display mode: the scan signal first provides a high voltage level pulse, and maintains a low voltage level; the common ground voltage constantly is the low voltage level; the data signal begins to be a high voltage level, constantly from a rising edge of the high voltage level pulse of the scan signal;

in the sensing mode, the scan signal first provides the high voltage level pulse, and maintains the low voltage level; the sensing control signal first provides a high voltage level pulse synchronized with the high voltage level pulse of the scan signal, and maintains the low voltage level.

12. The OLED pixel driving circuit according to claim 11, wherein in the sensing mode: the common ground voltage first provides a high voltage level pulse synchronized with the high voltage level pulse of the sensing control signal and maintains the low voltage level.

* * * * *